United States Patent [19]

Fisher

[11] Patent Number: 4,851,135

[45] Date of Patent: Jul. 25, 1989

[54] APPARATUS AND METHOD FOR FILTERING A FLUID

[75] Inventor: Mark J. Fisher, Rockford, Ill.

[73] Assignee: Sundstrand Corp., Rockford, Ill.

[21] Appl. No.: 171,782

[22] Filed: Mar. 22, 1988

[51] Int. Cl.⁴ .................................... B01D 39/00
[52] U.S. Cl. .................................. 210/791; 210/168; 210/333.01; 210/411; 210/412
[58] Field of Search ............... 210/332, 168, 333.01, 210/353–355, 407, 411, 412, 791

[56] References Cited

U.S. PATENT DOCUMENTS 2,038,293 4/1936 Jacob .
3,762,784 10/1973 Pachuta .
3,960,319 6/1976 Brown et al. ............... 494/27 X
4,043,918 8/1977 Orona ........................ 210/412 X
4,516,987 5/1985 Niggemann ..................... 55/52
4,533,471 8/1985 Collins ........................ 210/411 X
4,580,912 4/1986 Huneke .
4,696,075 9/1987 Grave ......................... 210/411

Primary Examiner—Charles Hart
Attorney, Agent, or Firm—Antonelli, Terry & Wands

[57] ABSTRACT

An apparatus and method for filtering a fluid by directing a flow of the fluid against a filter such that only a portion of the fluid passes through the filter and the remainder passes over the filter to clean it thereby preventing the filter from becoming clogged. The apparatus can be used in a rotary fluid management device of a dynamic isotope power system for filtering fluid therein which is to be used for lubricating bearings of the device for a period of many years with no maintenance.

10 Claims, 1 Drawing Sheet

APPARATUS AND METHOD FOR FILTERING A FLUID

TECHNICAL FIELD

The present invention is directed to an apparatus and method for filtering a fluid. More particularly, the invention is a method and apparatus for filtering a fluid lubricant to remove damaging particles therein before the lubricant is supplied to a device such as a bearing to be lubricated. The apparatus and method are particularly advantageous in that fluid can be filtered continuously for a period of many years with no maintenance and without clogging the filter.

BACKGROUND ART

Unmanned space vehicles used for exploring outer space may have a mission life of many years. A dynamic isotope power system designed for use in such space vehicles provides electrical power for devices within the vehicle. A decaying nuclear material, such as plutonium oxide, gives off heat in this type of power system. The heat is used to heat a fluid such as toluene to vaporize it to drive a turbine which, in turn, drives an alternator to generate electrical power. A rotary fluid management device of a dynamic isotone power system comprises bearings which require lubrication with a filtered lubricant to avoid damaging the bearings. Because no maintenance is possible during the long mission in outer space, there is a problem of insuring that the lubricant filter not get clogged.

In-line filters large enough to preclude clogging during the many years of the space vehicle's mission would require bringing the lubrication flow out of the rotary fluid management device of the dynamic isotope power system, filtering it, and routing it back into the rotary fluid management device. However, such a filtering arrangement is disadvantageous in that it adds to the size, weight and complexity of the power system. In-line filtering apparatus are, per se, known as shown in U.S. Pat. No. 4,580,912, for example.

DISCLOSURE OF INVENTION

An object of the invention is to provide an apparatus and method for filtering a fluid which can be used for many years, if desired, with no maintenance and without clogging the filter. Another object of the invention is to provide an apparatus and method for filtering a fluid which is compact, lightweight and mechanically simple such that the apparatus can be used in a rotary fluid managment device of a dynamic isotope power system without requiring bringing the lubricating flow out of the rotary fluid management device.

A further object of the present invention is to provide an apparatus and method for filtering a fluid wherein the filter is self-cleaning.

These and other objects are attained with the apparatus and method for filtering a fluid of the present invention wherein the apparatus comprises a filter through which a fluid can be passed for filtering the fluid, a flow path for fluid which has passed through the filter, and an arrangement for flowing fluid against the filter such that only a portion of the fluid which is flowed against the filter passes through the filter and along the flow path and the remainder passes over the filter to clean it thereby preventing the filter from becoming clogged. The fluid which is flowed against the filter has a high velocity when it strikes the filter. Some fluid passes through the filter for use as a lubricant, the remainder of the flow, which is the majority of the total flow in the disclosed embodiment, strikes the filter removing any particles caught by it. This impingement force makes the filter self-cleaning.

The arrangement for flowing fluid against the filter comprises an additional flow path for the fluid which is flowed against the filter and for the remainder of the fluid which passes over the filter. A pump provides the high velocity flow of fluid through the additional flow path, which flow is directed against the filter. According to the disclosed embodiment, the pump comprises a pitot tube which is placed in a moving fluid on the inner circumferential surface of a rotating drum. Bearings rotatably support the rotating drum. The filtered fluid is conveyed through the flow path from the filter to the bearings for lubricating the bearings.

In the disclosed form of the invention, the filter is a convex screen mesh which extends into the flow of fluid in the additional flow path such that the flowing fluid is directed against the side of the convex filter. The screen mesh of the filter has small openings therein which permits fluid passage through the filter but which prevent any particles from passing through the filter which are larger than a lubricant film thickness in a device to be lubricated with the filtered fluid.

The apparatus for filtering a fluid of the disclosed embodiment is combined with a rotary fluid management device of a dynamic isotope power system for filtering fluid therein. The apparatus is a compact, lightweight and mechanically simple solution to the difficult problem of providing filtered bearing lubrication flow during a mission life of many years with no maintenance of the filter and without clogging the filter.

These and other objects, features and advantages of the present invention will become more apparent from the following description when taken in connection with the accompanying drawings, which show, for purposes of illustration only, one preferred embodiment in accordance with the present invention.

BEST MODE FOR CARRYING OUT THE INVENTION

Figure 1:
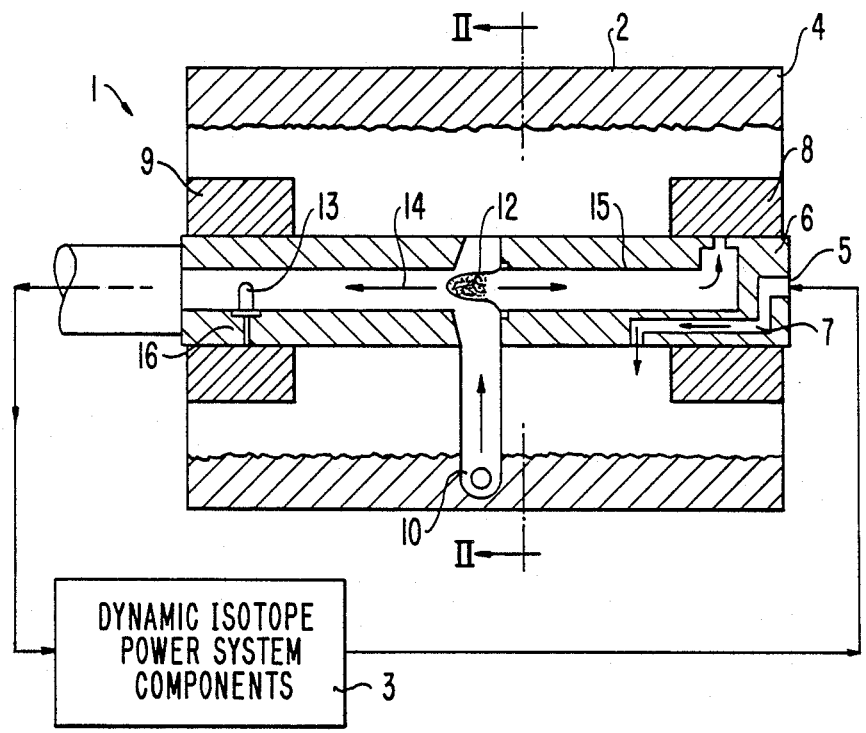
FIG. 1 is a schematic, cross-sectional view taken along the longitudinal central axis of the rotating drum of a rotary fluid management device of a dynamic isotope power system having an apparatus for filtering a fluid according to a preferred embodiment of the present invention.
Figure 2:
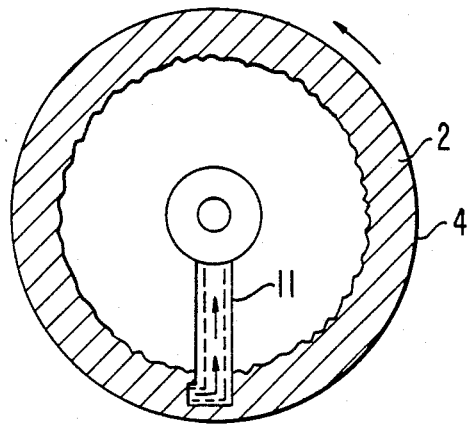
FIG. 2 is a cross-sectional view taken along the line II—II of the rotating drum of FIG. 1.

Referring now to the drawings, a dynamic isotope power system according to the present invention is generally indicated at 1. The system 1 comprises a decaying nuclear material such a plutonium oxide, which gives off heat. The heat is used to heat toluene 2 to vaporize it to drive a turbine, which, in turn, drives an alternator to generate electrical power. These components of the power system 1 are generally identified as dynamic isotope power system components 3 shown schematically in FIG. 1. The dynamic isotope power system 1 also includes a rotary fluid management device having a rotating drum 4 located downstream of a heat exchanger of the power system 1 as shown in Figure 1. The rotating drum 4 receives the cooled toluene from a condenser at an inlet 5 in a stationary central shaft 6 about which the drum 4 is rotatably supported.

The toluene passes through a passage 7 in the shaft 6 to the interior of the drum 4. The drum is rotated at high speed so that the liquid toluene 2 is separated from toluene vapors and collected on the inner circumferential surface of the rotating drum 4. The drum 4 is rotatably supported on the stationary shaft 6 by means of bearings 8 and 9.

The bearings 8 and 9 require filtered bearing lubrication flow. The source of the bearing lubrication flow is the toluene liquid itself within the rotating drum 4 of the rotary fluid management device of the dynamic isotope power system 1. However, the fluid must be filtered to remove particles larger than a few ten thousandths of an inch due to the small bearing film thickness in the bearings 8 and 9. If larger particles were entrained with the bearing lubrication, they would damage the bearings and reduce the life thereof. This is unacceptable where bearing maintenance is not possible as in an unmanned outer space mission having a life of many years.

To filter the fluid toluene for lubricating the bearings 8 and 9, according to the apparatus of the present invention a pitot pump 10 connected to the shaft 6 of the rotary fluid management device pmps toluene from the liquid toluene collected on the inner circumferential surface of the rotating drum 4 up through the tube 11 of the pitot pump and into the shaft 6. More specifically, the pitot pump 10 picks up fluid from the rotating drum and converts much of the velocity pressure thereof to static pressure. After the pumped fluid is diffused in the pitot tube 11, however, the fluid velocity is still quite large. This high velocity fluid, moving at a rate of two or three feet per second, for example, strikes filters 12 and 13 which protrude into the flow path for the pumped fluid provided by the pitot tube 11 and a passage 14 extending axially in the shaft 6 from the tube 11. When the high velocity fluid strikes the filters 12 and 13, some of the fluid passes through the filters and is conveyed by respective passages 15 and 16 for lubricating the bearings 8 and 9, respectively. The remainder of the fluid, which is the majority of the total flow, strikes the filters removing any particles caught by them. The impingement force of the high velocity fluid makes the filters self-cleaning. The fluid which does not pass through the filters passes over the filters to clean them, and then continues flowing along the passage 14.

In the disclosed form of the invention, the filters are convex. Preferably they are formed from screen mesh of stainless steel or aluminum, for example. The openings of the mesh filters are very small, on the order of several ten thousandths of an inch, for example, 0.0002 inch in diameter. The size of the openings is selected to prevent particles which are larger than the bearing film thickness in the bearings 8 and 9 from passing through the openings, and hence through the filter. The small openings provide considerable resistance to the flow of fluid through the filters. In the illustrated embodiment, about 10% of the fluid directed against the filters 12 and 13 passes through the filters and the remaining 90% passes over the filter and continues to flow along the passage 14. In this way, the filter is prevented from becoming clogged during operation of the power system. As a result, the power system can be operated for many years with no maintenance while maintaining a flow of filtered lubricant to the bearings 8 and 9 of the locating drum 4.

While I have shown and described only one embodiment in accordance with the present invention, it is understood that the same is not limited thereto, but is susceptible to numerous changes and modifications as known to those skilled in the art. For example, the method and apparatus of the invention are not limited to use in a dynamic isotope power system but could be used in other apparatus having a filter for filtering a fluid. Also, the convex shape of the filters is particularly advantageous in the disclosed embodiment of the invention but other arrangements and shapes could be employed so long as the flow directed against the filter can have a portion which passes through the filter and a remainder which passes over the filter to clean it. Therefore, I do not wish to be limited to the details shown and described herein but intend to cover all such changes and modifications as are encompassed by the scope of the appended claims.

I claim:

1. A rotary fluid management device of a dynamic isotope power system comprising a rotating drum for receiving a vaporizable fluid which is circulated in said power system, said rotating drum centrifugally separating vapor and liquid of said vaporizable fluid such that the liquid is on the inner circumferential surface of the rotating drum, bearing means for rotatably supporting said drum, means for lubricating said bearing means with said vaporizable fluid, said means for lubricating comprising a pump for pumping vaporizable fluid to the bearing means to lubricate the bearing means, said pump being in the form of a pitot tube which is placed in the moving liquid on the inner circumferential surface of the rotating drum, a filter through which pumped fluid is to be passed for filtering the fluid, means defining a flow path for fluid which has passed through said filter, said pump flowing fluid against said filter such that only a portion of the fluid which is flowed against the filter passes through the filter and along said flow path and the remainder passes over the filter to clean it thereby preventing the filter from becoming clogged.

2. The apparatus according to claim 1, further comprising said means for flowing comprises means defining an additional flow path for said fluid which is flowed against said filter and for said remainder of the fluid which passes over said filter.

3. The apparatus according to claim 1, wherein said pump directs a high velocity flow of said fluid against said filter such that the force of impingement of said flow against said filter removes particles caught by said filter.

4. The apparatus according to claim 1, wherein said filter is convex.

5. The apparatus according to claim 4, wherein said pump directs said flow against the side of said convex filter.

6. The apparatus according to claim 1, wherein said filter is a screen mesh having small openings therein which permit fluid passage through said filter but which prevent any particles from passing said filter which would damage the bearing means to be lubricated with said filtered fluid.

7. The apparatus according to claim 1, wherein the vaporizable fluid is toluene.

8. A method of lubricating at least one bearing in a dynamic isotope power system wherein a vaporizable fluid is circulated, comprising the steps of introducing the vaporizable fluid into a rotating drum and centrifugally separating the liquid and vapor phases of the fluid in the rotating drum so that the liquid is on the inner circumferential surface of the rotating drum, pumping liquid on the inner circumferential surface of the drum using a pitot tube to the at least one bearing to lubricate the bearing, wherein the liquid being pumped to the at least one bearing is filtered by directing the liquid against a filter such that only a portion of the liquid which is flowed against the filter passes through the filter and to the at least one bearing and the remainder passes over the filter to clean it thereby preventing the filter from becoming clogged.

9. A method according to claim 8 wherein said step of flowing fluid against said filter comprises flowing said fluid at a high velocity against said filter such that the force of impingement of said flow against said filter removes particles caught by said filter.

10. The method according to claim 8, wherein the vaporizable fluid is toluene.

* * * * *